United States Patent
Montanari

(10) Patent No.: US 7,437,263 B2
(45) Date of Patent: Oct. 14, 2008

(54) METHOD AND APPARATUS FOR CONTROLLING THE MACHINING OF MECHANICAL PIECES

(75) Inventor: William Montanari, Castel Maggiore Bo (IT)

(73) Assignee: Marposs Societa' per Azioni, Bentivoglio BO (IT)

( * ) Notice: Subject to any disclaimer, the term of this patent is extended or adjusted under 35 U.S.C. 154(b) by 0 days.

(21) Appl. No.: 11/597,796

(22) PCT Filed: Jun. 1, 2005

(86) PCT No.: PCT/EP2005/052514

§ 371 (c)(1),
(2), (4) Date: Nov. 28, 2006

(87) PCT Pub. No.: WO2005/119383

PCT Pub. Date: Dec. 15, 2005

(65) Prior Publication Data

US 2007/0233422 A1   Oct. 4, 2007

(30) Foreign Application Priority Data

Jun. 4, 2004   (IT)  ................ BO2004A0356

(51) Int. Cl.
*G06F 5/08* (2006.01)

(52) U.S. Cl. .............. 702/146; 702/145; 702/155; 702/156

(58) Field of Classification Search .......... 702/81, 702/83, 95, 127, 150, 168, 189, 145, 146, 702/155, 156; 33/555.3; 451/9; 700/174

See application file for complete search history.

(56) References Cited

U.S. PATENT DOCUMENTS

| | | | | |
|---|---|---|---|---|
| 5,274,566 A | * | 12/1993 | Reed et al. | 700/195 |
| 6,419,563 B1 | * | 7/2002 | Ido et al. | 451/57 |
| 6,430,832 B1 | * | 8/2002 | Dall'Aglio et al. | 33/555.1 |
| 6,645,047 B1 | * | 11/2003 | Liskow | 451/9 |
| 6,931,749 B2 | * | 8/2005 | Dall'Aglio | 33/555.3 |

FOREIGN PATENT DOCUMENTS

| | | |
|---|---|---|
| EP | 0 562 632 A1 | 9/1993 |
| EP | 0 791 873 A1 | 8/1997 |
| GB | 1 402 893 A | 8/1975 |
| GB | 2 317 130 A | 3/1998 |

* cited by examiner

*Primary Examiner*—Eliseo Ramos-Feliciano
*Assistant Examiner*—Felix Suarez
(74) *Attorney, Agent, or Firm*—Dickstein Shapiro LLP

(57) ABSTRACT

A method and a relevant apparatus for controlling the machining of a piece (18,38) rotating in a numerical control machine tool (33) includes the steps of detecting instantaneous values (V(i)) indicative of the dimensions of the piece during the machining, performing dynamic processing of the detected instantaneous values and controlling at least one machining phase on the basis of the processing. The method includes dynamic calculation of average values (M(j)) of sequences of the detected values, acquisition of a variation index (P) indicative of the average values trend during the machining and of a correction coefficient (K) that allows for the delay of the calculated average values with respect to the actual dimensions of the piece, and processing of an instantaneous dimension (RI) of the piece that is transmitted to the numerical control of the machine tool for controlling the machining.

18 Claims, 3 Drawing Sheets

METHOD AND APPARATUS FOR CONTROLLING THE MACHINING OF MECHANICAL PIECES

TECHNICAL FIELD

The present invention relates to a method for controlling the machining of a piece in rotation in a machine tool by means of a checking apparatus, including the following steps: detecting instantaneous values indicative of radial dimensions of the piece, processing the detected instantaneous values, and controlling at least one machining phase on the basis of the detected and processed instantaneous values.

The invention also relates to an apparatus for checking a piece in rotation during the machining in a numerical control machine tool, including a checking head adapted to cooperate with the piece in rotation and emit electric signals indicative of the dimensions of the piece, and a processing and display device connected to the checking head and to the numerical control of the machine tool, and adapted to receive the signals from the checking head, detect and process instantaneous values, and provide the numerical control with signals indicative of the dimensions of the piece.

BACKGROUND ART

It is known to carry out the machining of mechanical pieces, more specifically in numerical control grinding machines, with in-process checking, i.e. by utilizing gauging heads or other checking and/or measuring apparatuses that detect dimensions of the piece during the machining and signal the reaching of a preset dimension in order to control the stop of the machining and/or the transition to a subsequent machining phase. European patent application No. EP-A-0791873 discloses a specific method of machining in a grinding machine, according to which the machined piece is a crankpin of a crankshaft that rotates with orbital motion about the main axis of the shaft while the grinding-wheel slide translates with respect to such axis.

In the machining of this type of pieces, the reaching of the extremely high standards of accuracy that are nowadays required is difficult owing to the concurrent requirement of ever shorter production times. In fact, the machining cycles must be very short, with a high ratio between the machining feed rate of the grinding-wheel in movement towards the pin (that determines the stock removal rate), and the shaft rotation speed. As a consequence, the cross-section of the machined pin has, instant-by-instant and up to a final phase, for example the "sparkout" phase, an accentuated axial asymmetry, that is radial dimensions that considerably vary—in relation with the requested accuracy —from one point of the circumference to the other. This makes the in-process checking, carried out by known heads with one or more feelers that contact just certain pin surface areas, necessarily separate from the area that is actually machined at that instant, particularly difficult. The method of machining according to the mentioned patent application No. EP-A-0791873 foresees a sequence of steps including a stop at an intermediate position during the grinding-wheel slide machining feed towards the pin (while the slide continues to displace in order to follow the orbitally rotating pin without removing material) when the in-process checking head signals the exceeding of a preset diameter dimension, by a certain margin higher than the desired final dimension. The method also foresees that the dimensions detected in one or more pin revolutions, when the grinding-wheel slide is in the intermediate position, be processed for calculating an average value from which there is determined the amount of the subsequent grinding-wheel slide feed necessary for reaching the desired dimension. The checking head is retracted and inactive in the last part of the machining, that foresees the grinding-wheel slide machining feed of the determined amount and a final "sparkout" phase, whereupon the grinding-wheel slide is stopped again.

The method according to the mentioned European patent application attempts to solve the problems introduced by the contrasting rising requirements in terms of production speed and accuracy of the results.

However, the proposed machining cycle is burdened by controls and additional operations, for interrupting and then continuing the machining feed of the grinding-wheel slide before reaching the desired dimension, that are in contrast with the machining time reduction requirements. Furthermore, such additional operations contribute to deteriorate the involved electric and mechanic components and represent possible additional causes of grinding machine failures and malfunctions.

Apparatuses for the in-process checking of crankpins in orbital motion are described in the international patent application No. WO-A-9712724, filed by the same applicant of the present patent application. Such apparatuses include checking heads with a Vee-shaped reference element that rests on two points on the surface of the pin to be checked, and a movable feeler that contacts such surface between the two rest points and transmits the displacements to transducer means along a direction that substantially corresponds to the bisecting line of the "Vee".

The apparatuses produced by the owner of the present patent application according to the teachings of the patent application No. WO-A-9712724 guarantee excellent results from a metrological point of view, utmost applicative simplicity and low forces of inertia, and the standards of performance that are reached in the related applications in grinding machines confirm the remarkable quality and reliability of the adopted solutions.

However, the requirements for higher machining speed while maintaining unchanged or increased the degree of accuracy, cause the previously mentioned inconveniences even with such apparatuses.

DISCLOSURE OF THE INVENTION

An object of the present invention is to provide a method and an associated apparatus for controlling the machining of mechanical pieces that enables a considerably accurate and reliable machining in extremely short times.

This and other objects are achieved by a method according to claim 1 and an apparatus according to claim 12. A method and an apparatus according to the invention can be advantageously utilized for controlling the operations for grinding pins in orbital motion.

One of the advantages that a method and an apparatus according to the invention provide consists in the possibility of efficiently compensating possible errors due, for example, to the use of apparatuses with "Vee" shaped reference element.

BRIEF DESCRIPTION OF THE DRAWINGS

The invention is hereinafter described with reference to the enclosed sheets of drawings that show a preferred embodiment of the invention and are given by way of non-limiting example, wherein.

BEST MODE FOR CARRYING OUT THE INVENTION

Figure 1:
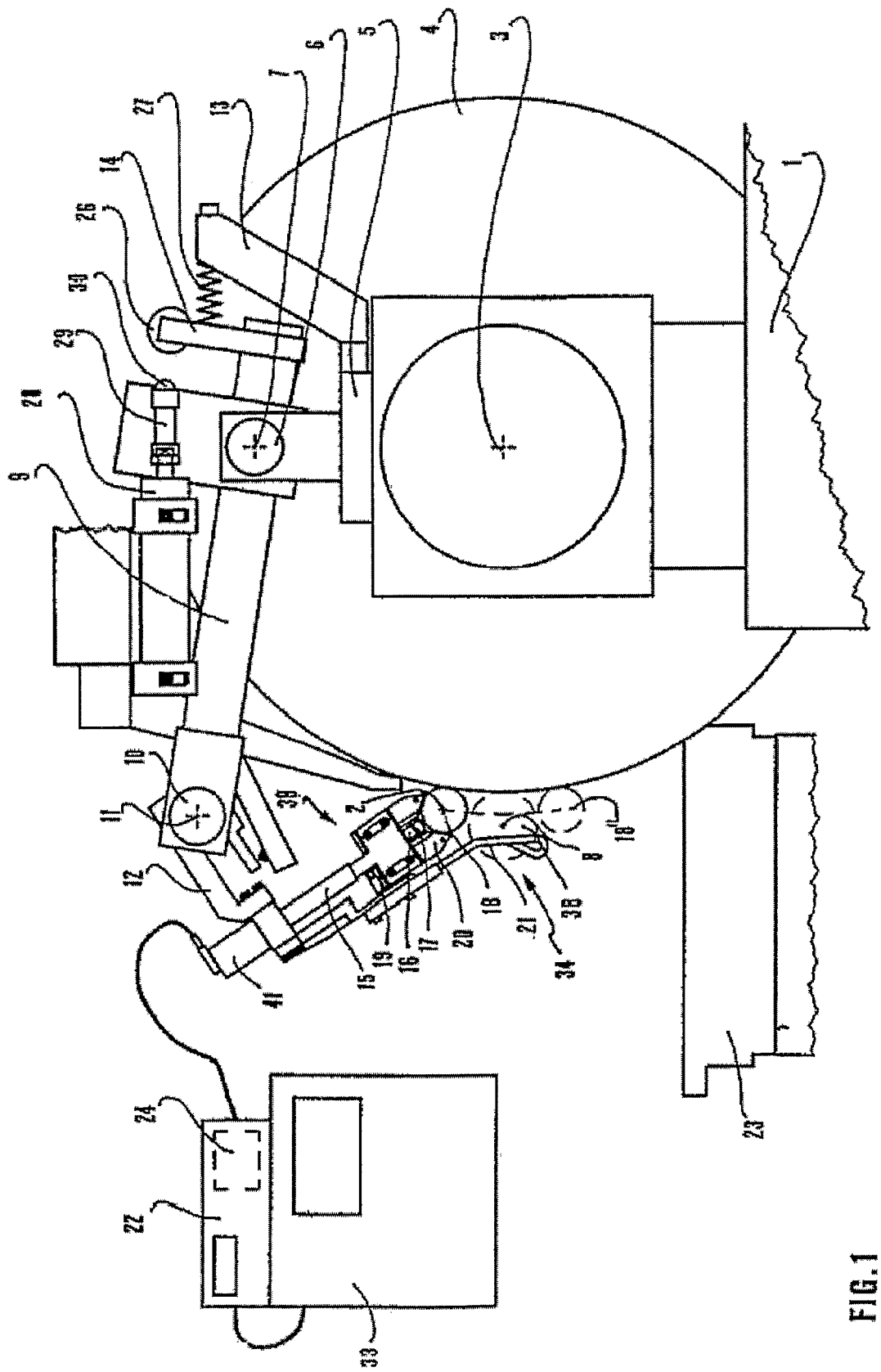
FIG. 1 is a side view of a measuring apparatus mounted on the grinding-wheel slide of a crankshaft grinding machine, shown in working condition during the checking of a crankpin.

FIG. 1 illustrates an apparatus according to the invention for controlling the machining of a piece in a machine tool, more specifically an in-process device for checking a crankpin 18 of a crankshaft 34 in a grinding machine with computer numerical control ("CNC") 33. The crankpin 18 has substantially cylindrical shape and defines an axis of symmetry 2. A main journal 38 of the crankshaft 34 can be checked by the same apparatus. Many constructional features of the apparatus correspond to those shown and described in the mentioned patent application No. WO-A-9712724.

In the embodiment shown in FIG. 1, a grinding-wheel 4 is coupled to a grinding-wheel slide 1 that defines an axis of rotation 3 for the grinding-wheel 4. A worktable 23 supports—and defines an axis of rotation 8 for—the crankshaft 34. The grinding-wheel slide 1 carries a support device with a support element 5 and a first 9 and a second 12 rotating, coupling element. The support element 5 supports, by means of a rotation pin 6 defining a first axis of rotation 7 parallel to the axis of rotation 3 of the grinding wheel 4 and to the axis of rotation 8 of the crankshaft 34, the first rotating, coupling element 9. In turn, the coupling element 9 supports, by means of a rotation pin 10 defining a second axis of rotation 11 parallel to the axis of rotation 3 of the grinding-wheel 4 and to the axis of rotation 8 of the crankshaft 34, the second rotating, coupling element 12. At the free end of the coupling element 12 there is coupled a tubular guide casing 15 wherein there can axially translate a transmission rod 16 carrying a feeler 17 for contacting the surface of the pin 18 to be checked. The tubular casing 15, the rod 16 and the feeler 17 are part of a measuring or checking head 39, that also includes a support block 19, fixed to the lower end of the tubular guide casing 15. The block 19 supports a reference device 20, Vee-shaped, adapted to engage the surface of the pin 18 to be checked, by virtue of the rotations allowed by the rotation pins 6 and 10. The transmission rod 16 is movable substantially along the bisecting line of the Vee of the reference device 20, or according to a direction that is slightly angular with respect to the bisecting line.

The support block 19 further supports a guide device 21 that, as described in the mentioned international patent application No. WO-A-9712724, serves to guide the reference device 20 to engage the pin to be checked and maintain contact with the pin while the reference device 20 displaces away from the pin, for limiting the rotation of the first coupling element 9 and of the second coupling element 12 about the axes of rotation 7, 11 defined by the pins 6 and 10.

The axial displacements of the transmission rod 16 with respect to a reference position are detected by means of a measurement transducer, fixed to the casing 15, for example a transducer 41 of the LVDT or HBT type (per se known and herein not described in detail), with fixed windings and a ferromagnetic core that is movable with the transmission rod 16.

The transducer 41 of the head 39 is connected to a processing and display device 22, in turn connected to the numerical control 33 of the grinding machine.

The crankshaft 34 to be checked is positioned on the worktable 23, between a spindle and a tailstock, not shown, that define the axis of rotation 8, coincident with the main geometric axis of the crankshaft 34. The crankpin 18 and the main journal 38 rotate about the axis 8, the former by performing an orbital trajectory.

An actuator device comprises a double-acting cylinder 28, for example of the hydraulic type. The cylinder 28 is supported by the grinding-wheel slide 1 and comprises a rod 29, coupled to the piston of the cylinder, carrying at the free end a cap 30. An arm 14 is coupled at an end to the element 9 and carries an abutment with an idle wheel 26 at its opposite end. When the cylinder 28 is activated for displacing the piston and the rod 29 towards the right (with reference to FIG. 1), the cap 30 contacts the abutment 26 and causes the displacement of the checking apparatus to a rest position according to which the reference device 20 is separate from the surface of the pin. An overhang 13 is rigidly fixed to the support element 5 and a coil return spring 27 is coupled to the overhang 13 and to the arm 14. When the rod 29 retracts, in order to allow the apparatus to displace to the checking condition, and the cap 30 disengages from the abutment, or idle wheel 26, the support block 19 approaches the crankpin 18 (or the main journal 38) through rotation of the coupling elements 9, 12, and the apparatus reaches and maintains the checking condition, substantially in the way described in the hereinbefore mentioned international patent application No. WO-A-9712724 which is referred to for a more detailed description. The cooperation between the crankpin 18 or the main journal 38 and the reference device 20 is maintained thanks to the force of gravity. The action of the coil spring 27 is particularly important in the checking of the crankpin 18 in orbital motion shown in FIG. 1. In fact, the tension of the spring 27 increases with the lowering of the support block 19 and partially and dynamically counterbalances the forces due to the inertia of the component parts of the checking apparatus that move by following the displacements of the crankpin 18. In this way it is possible, for example, to avoid over stresses between the reference device 20 and the crankpin 18, at the lower position (identified by reference number 18"), that could cause the deformation of the Vee of the reference device 20. On the other hand, since during the raising movement of the apparatus (due to rotation of the crankpin towards the upper position 18') the pulling action of the spring 27 decreases, the inertial forces that—at the upper position 18'—would tend to release the engagement between the Vee-shaped reference device 20 and the crankpin 18 can be properly counterbalanced. In this latter case it should be realized that the counterbalancing action is achieved by diminishing the pulling action of the spring 27. In other words, the coil return spring 27 does not cause any pressure between the reference device 20 and the crankpin 18 that mutually cooperate, as described above, simply owing to the force of gravity.

The transducer 41 of the head 39 sends to the processing and display device 22 signals the values of which are indicative of the position of the transmission rod 16 and thus of the feeler 17. In such device 22, that includes a memory unit 24, the signals arriving from the head 39 are processed as described hereinafter with reference to FIGS. 2, 3, and 4.

Figure 2:
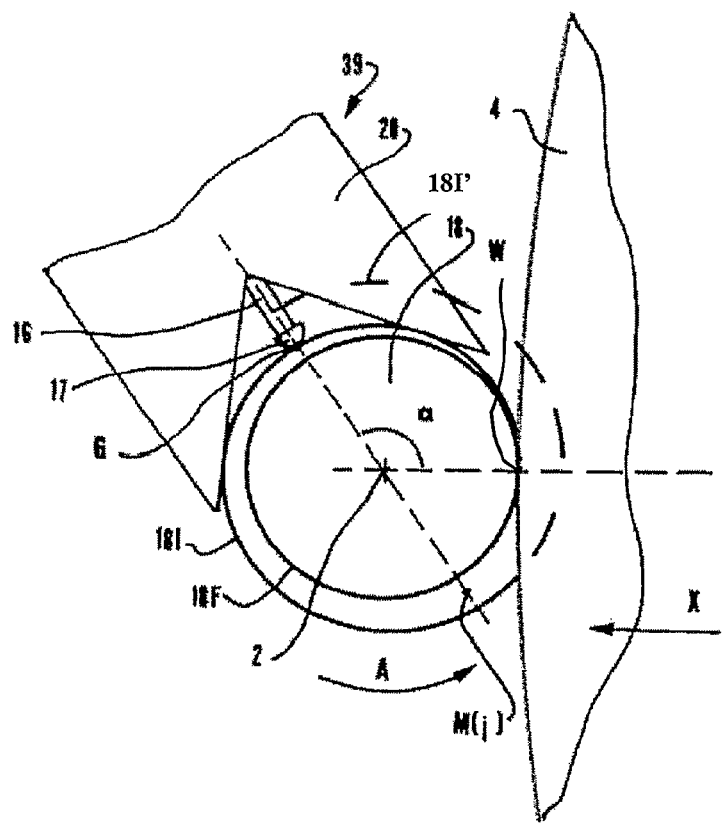
FIG. 2 shows, in simplified and enlarged form, a detail of FIG. 1.

FIG. 2 shows, in simplified form, the feeler 17, the transmission rod 16 and the Vee-shaped reference device 20 of the head 39 in the phase for the in-process checking of the crankpin 18. The latter phase is also shown in FIG. 1, in which the grinding wheel 4 is represented while it is grinding the external surface of such pin 18 that rotates in orbital motion about the axis 8 of the shaft 34 and, consequently, about its axis 2, in the sense indicated by the arrow A. In this phase the grinding-wheel slide 1 performs, on reception of controls from the numerical control 33, translation displacements with respect to the axis 8 along a direction X in order to follow the orbital motion displacements of the pin 18, and an additional machining feed, also along the direction X with respect to the axis 2 of the pin 18, for removing material from the surface of the pin 18. Many types of machine tools can foresee displacements of the worktable 23 in order to implement the mentioned following and/or machining displacements.

Two circular lines 18I and 18F schematically show the profile of the external surface of the pin 18 at the instant I and, respectively, the final profile of the surface that it would be possible to obtain by stopping at the same instant I the machining feed of the grinding-wheel slide 1. It should be realized that in FIG. 2 the helical shape of the profile 18I, that depends on the ratio between the machining feed rate of the slide 1 and the rotation speed of the pin 18, is shown, for illustrative purposes, in an intentionally exaggerated way with respect to actual size.

In the cross-section of FIG. 2, the points on the surface of the pin 18 that instant-by-instant are in contact with the grinding-wheel 4 and with the feeler 17 are indicated by references W and G and identify, respectively, a machining area and a checking area. The direction of displacement of the rod 16, that includes the point G, is substantially incident to the axis 2 of the pin 18 and forms an angle α with respect to the straight line, that is also incident to the axis 2 of the pin 18, where the point W of contact with the grinding wheel 4 lies.

It should be realized that, from a conceptual point of view, while the checking area can be identified with the point G, the machining area has a certain extension in a direction perpendicular to the plane of the FIGS. 1 and 2. However, in the present description, for the sake of simplicity and clarity, reference is made just to the point W of contact between the pin 18 and the grinding-wheel 4 at the illustrated cross-section.

The signals, sent by the head 39 during the rotation of the pin 18 and detected at a predetermined frequency in the device 22, define a sequence of instantaneous values V(i) that are proportional to radial dimensions of the pin 18. As shown in FIG. 2, at any instant I the radial dimension of the pin 18 at the point W in contact with the grinding wheel 4 differs from the dimension detected by the head 39 at the point G. Therefore, each detected instantaneous value V(i) indicates after a certain delay the dimension actually reached at the point W of machining.

A first processing, that takes place in the device 22, enables to dynamically calculate an average value M(j) given by $$M(j) = \frac{\sum_{i=s-(N-1)}^{s} V(i)}{N} \quad (1)$$

where s is a progressive number that identifies the most recently detected instantaneous value V(i), and N is the number of instantaneous values V(i) detected in a complete rotation of the shaft 34 about the axis 8 and stored in the unit 24.

The average value M(j), or instantaneous rolling average, enables among other things to compensate alterations of the detected values V(i) introduced by the Vee-shaped device 20 that, by contacting the surface of the pin 18, is sensitive to shape errors of the pin 18 that cause unwanted displacements of the feeler 17. The rolling average M(j) is continuously updated further to the detecting of every fresh instantaneous value V(i) of the sequence. At the instant I the average value M(j) of the instantaneous values V(i) detected in the previous complete rotation, is also "in delay" with respect to the dimension machined at the point W. FIG. 2 shows the radial position of the average value M(j) at the instant I and a broken line 18I' indicates part of the profile on the basis of which there is calculated the average value M(j).

A method according to the present invention for controlling the machining of a pin with the apparatus shown in FIGS. 1 and 2 is hereinafter described with reference to the block diagram of FIG. 3 and the graph of FIG. 4.

Figure 3:
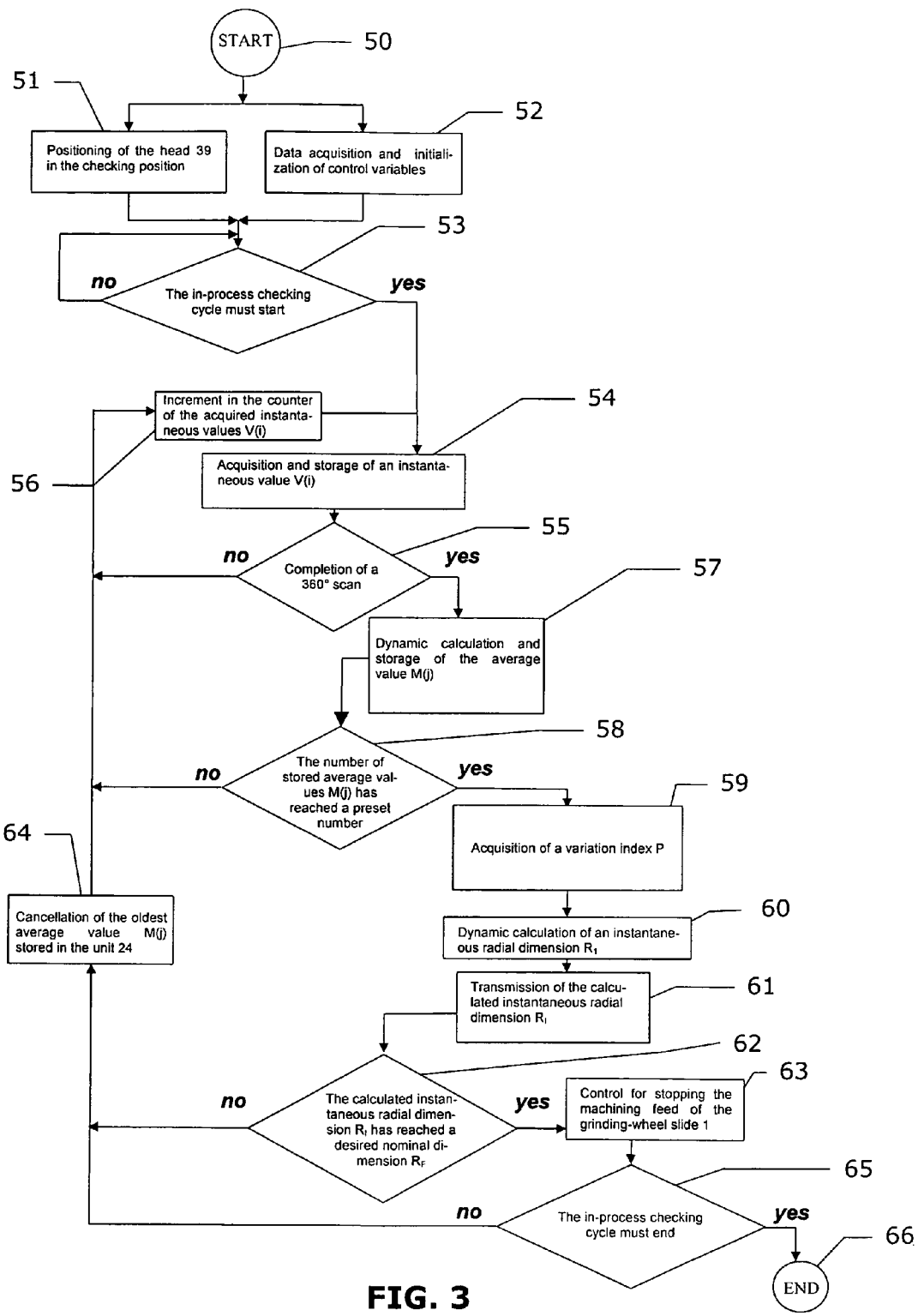
FIG. 3 is a block diagram of a preferred embodiment of a control method according to the present invention.

The blocks of the diagram of FIG. 3 have the following functions:

block 50—start of the controlling procedure;

block 51—positioning of the head 39 in the checking position on the pin 18 in orbital motion, while the grinding-wheel slide 1 performs displacements along the direction X, including the machining feed towards the pin 18;

block 52—data acquisition and initialization of control variables;

block 53—verification about the start of the in-process checking phase, on control of the numerical control 33;

block 54—acquisition and storage of an instantaneous value V(i) on the basis of signals transmitted from the head 39;

block 55—verification about the completion of a first 360° scan performed by the feeler 17 on the surface of the pin 18;

block 56—increment in the counter of the acquired instantaneous values V(i);

block 57—dynamic calculation and storage of the average value M(j) of the sequence of instantaneous values V(i) acquired in the most recent 360° scan;

block 58—comparison between the number of stored average values M(j) and a preset number;

block 59—acquisition, more specifically dynamic calculation and storage, of a variation index P indicative of the trend of the variations of the C most recently acquired and stored average values M(j);

block 60—dynamic calculation of an instantaneous radial dimension $R_I$ of the pin 18;

block 61—transmission of the calculated instantaneous radial dimension $R_I$ to the numerical control 33 of the grinding machine;

block 62—comparison between the calculated instantaneous radial dimension $R_I$ and a desired nominal dimension $R_F$;

block 63—control for stopping the machining feed of the grinding-wheel slide 1;

block 64—cancellation of the oldest average value M(j) stored in the unit 24;

block 65—verification about the fact that the in-process checking phase ends upon control of the numerical control 33; and block 66—end of the controlling procedure.

Figure 4:
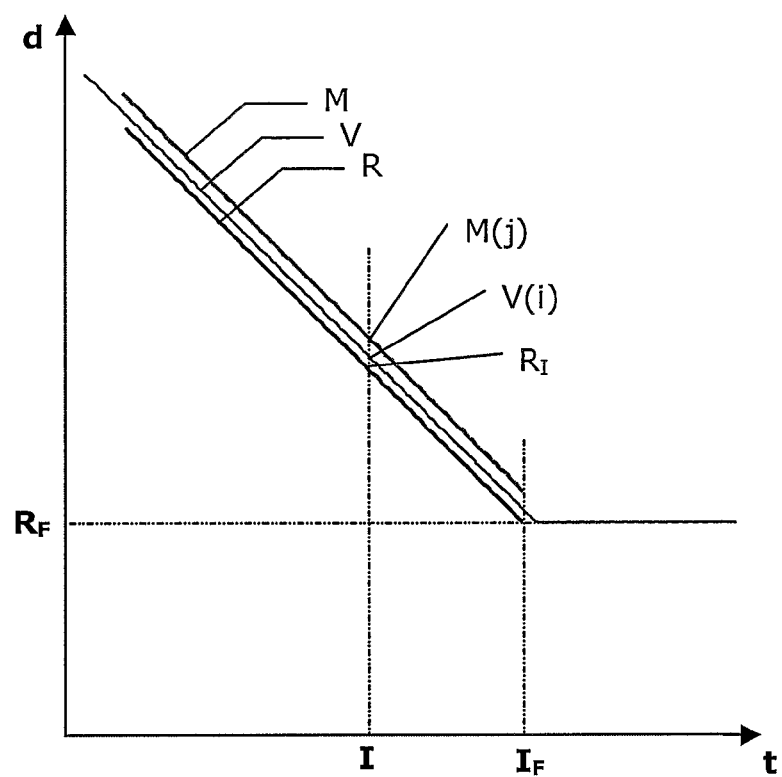
FIG. 4 is a graph representing the trend of some quantities detected and calculated according to the method of FIG. 3.

The graph of FIG. 4 shows curves V, M and R that represent the trend in time of the sequence of detected instantaneous values V(i), of the average values M(j), and of the calculated instantaneous radial dimensions $R_I$, respectively.

The method according to the diagram of FIG. 3 foresees a starting phase in which, concurrently with the physical positioning of the head 39 on the pin 18 that is machined in the grinding machine (block 51), there occurs the acquisition and setting of some parameters (block 52), as the rotation speed ω of the piece, that is a machining parameter of the machine, the angle α that identifies the point G in which the feeler 17 contacts the surface of the pin 18, a sampling period T of the instantaneous values V(i), and a number C, for example set by the operator, that defines the number of average values M(j)

that must be simultaneously kept in the memory unit 24 in order to carry out suitable processings, as hereinafter described in more detail. It should be realized that the previously mentioned number N of instantaneous values V(i) detected for each complete pin revolution can be obtained from the parameters regarding the rotation speed ω (for example in rpm) of the piece and the sampling period T (for example in seconds) in this way:

$$N = \frac{60}{\omega * T} \quad (2)$$

When the numerical control 33 of the grinding machine sends the signal for the start of the in-process checking cycle (block 53), the phase of acquisition and storage of the samples (block 54, 56), that is of the instantaneous values V(i), starts. When there is detected the completion of a complete 360° scan (block 55), for example by checking the acquisition of the N-th instantaneous value V(i), a first average value M(j) is dynamically calculated (block 57) by means of the equation (1) and stored in the unit 24. The phases for the acquisition of instantaneous values V(i) (block 54) and calculation of subsequent average values M(j) (block 57) continue until (block 58) the number of average values M(j) concurrently present in the memory unit 24 corresponds to the set number C. Thus, such average values M(j) are utilized for calculating (block 59) the value of the variation index P indicative of the inclination of the curve that represents, in FIG. 4, the trend in time of the average values M(j), by means of the following equation:

$$P = \frac{\sum_{j=s-(C-1)}^{s-1}(M(j+1)-M(j))}{C-1} \quad (3)$$

The index P is a negative number that represents the average variation of the average values M(j) between a sample and the other on the basis of a predetermined number C of average values.

On the basis of the current average value M(j), the variation index P and a correction coefficient K that considers the evaluation delays introduced by the geometry of the system, more specifically by the mutual arrangement of the points G and W, there is dynamically calculated (block 60) the instantaneous radial dimension $R_I$ as $$R_I = M(j) + P * K \text{ where} \quad (4)$$

$$K = N * \frac{\alpha + 180}{360} \quad (5)$$

In practice K is a correction coefficient that considers the previously mentioned number N of instantaneous values V(i) detected for each complete revolution of the pin and of the delay between the average value M(j) and the dimensions reached at the identical instant I at the machining point W.

With reference to the graph of FIG. 4, at the instant I
there is detected the value V(i),
there is calculated and stored the average value M(j) on the basis of the N instantaneous values V(i) with i=(s−(N−1)), . . . , s detected in the last 360° rotation, there is evaluated the index P indicative of the inclination of the curve M on the basis of the last C average values M(j) with j=(s−(C−1)), . . . , s, and
there is calculated the instantaneous radial dimension $R_I$.

The dimension $R_I$, that is an evaluation of the radial dimension of the pin 18 at the point W where the surface of the pin is machined, is transmitted (block 61) from the processing and display device 22 to the numerical control 33 of the grinding machine. The numerical control 33 can advantageously verify when (block 62) the instantaneous radial dimension $R_I$ reaches the value of the desired nominal dimension $R_F$, and consequently control the stop of the machining feed of the grinding-wheel slide 1 (block 63). It should be realized that the management of the instantaneous radial dimension $R_I$ provided by the device 22 is in any case defined by the numerical control 33 of the machine that controls, as previously stated, the operations described with reference to the blocks 62 and 63 and/or other possible machining displacements on the basis of suitable programs that depend, among other things, on the characteristics of the piece being machined. The end (block 66) of the in-process checking is likewise determined, after the stop of the machining feed of the grinding-wheel 4 or, for example, at a subsequent moment, upon control of the numerical control 33 (block 65). The block 64 of FIG. 3 shows, in simplified form, the updating of the stored average values for keeping in the memory unit 24 just the last C calculated average values M(j), for instance by cancelling the oldest value M(j) with j=(s−(C−1)) among those utilized for the calculation of the index P in order to thereafter replace it with a fresh value in the subsequent processing (block 57).

In the graph of FIG. 4, the instant $I_F$ indicates the moment at which the calculated dimension $R_I$ reaches the value $R_F$ and, according to the above described example, the numerical control 33 controls the stop of the machining feed of the grinding-wheel slide 1 in the direction X, with respect to the pin 18 in orbital motion. The machining continues with a phase in which the grinding-wheel slide 1 continues to perform transversal displacements, with respect to the axis of rotation 8 of the shaft 34, in order to follow the pin 18 for example in a single orbital rotation of the latter, substantially without machining feed displacements towards the axis 2 of the pin 18. In this final phase the external surface of the pin 18 is substantially rounded off in order to take on a profile that corresponds to the one shown in FIG. 2 and identified by reference 18F.

Thus, the method according to the invention, for example according to the just described embodiment, enables to verify, on the basis of the instantaneous value V(i) detected by the head 39, which is the radial dimension of the pin 18 actually reached at that instant at the point W in contact with the grinding-wheel 4. Consequently it is possible to control in a continuous way the machining of the pin 18, for example until the reaching of the desired nominal dimension $R_F$, thus obtaining pieces machined with particular accuracy and reliability in extremely short times, without there being the need to interrupt the machining feed of the grinding-wheel 4.

The described method can apply to machinings that foresee machining feeds of the grinding-wheel slide 1 at high rate (for example in the order of 15 μm/s) with relatively slow shaft rotations (for example from 20 to 60 rpm) and sampling periods from 0.5 to 4 ms. The number N of samples per revolution of the pin can be in the order of the thousand, while the number C of average values M(j) for the calculation of the index P can be, for example, of approximately 10.

A typical value of the angle α is, for example, 120°. It should be realized that in applications as the one illustrated in FIGS. 1 and 2, the amplitude of the angle α is subject to slight variations during the piece rotation, that depend on the geometric and kinematic features of the system. However, in the checking of the radial dimensions of the pin 18, these variations, that remain within a range of +/−5°, are absolutely negligible. In fact, from the equation (5) it follows that an inaccuracy of 5° generates a variation of 1.3% (5/360) the average value M(j) being constant, and substantially is not perceived in the calculation of the value $R_I$.

The correction coefficient K calculated by the equation (5) enables to apply the method according to the invention with excellent results. It is also possible to allow for a slight off-set with respect to the point G of the N detected instantaneous values V(i) on the basis of which the average values M(j) are calculated, by means of the following equation for the calculation of the correction coefficient:

$$K' = N * \frac{\alpha + 180}{360} + \frac{1}{2} \quad (5')$$

However, in almost the totality of cases, when N is greater than a few tens (as previously stated, a typical value is of approximately 1000), the difference between K and K' is not practically detectable.

Other possible variants with respect to the method herein so far described can foresee, among other things, a different calculation of the variation index, for example by evaluating an angle or a ratio between the detected and calculated quantities, instead of the negative number P mentioned in the example, with consequent modification of the equation (4) for the calculation of the instantaneous radial dimension $R_I$.

In a different embodiment, the acquisition of the variation index P takes place not by means of calculations, but through direct setting of a value, for example by an operator, on the basis of the machining feed rate. In fact, when the machining feed rate is constant, the index P is also constant and there is no need to dynamically calculate the variation index P at each piece rotation. In other words, if the machining speed rate is constant, the inclination of the curve M is constant and the processing and display device 22 can be provided with the variation index P with no further processing.

The latter embodiment is particularly advantageous when the piece undergoes two or more machining phases, with different machining feed rates. By setting the value of the variation index P for each machining phase, it is possible to enhance accuracy in the dynamic calculation of the instantaneous radial dimension $R_I$ when passing from a machining phase to the other, and thus from a machining feed rate to the other.

In another embodiment, it is also possible to dynamically calculate the variation index P on the basis of a preset number of initial values M(j) and then utilise the calculated variation index P for the subsequent processing, in an entirely similar way as described hereinbefore. To minimise errors in calculating the variation index P, an average value of a preset number of calculated values of the variation index P can be evaluated.

In particular applications in which the nature of the shape errors of the machined piece is substantially a priori known, the average values M(j) can be evaluated on the basis of a number of instantaneous values V(i) smaller than N, or rather on the basis of a movable angular window having a fixed amplitude that can be programmed (for example 120°, or 180° wide).

Obviously the method according to the invention is also feasible in applications in which the instantaneous values V(i) detected by the signals of the head 39 undergo other processings for compensating alterations due, for example, to thermal variations or to the limited linearity of the head 39.

A method and an apparatus according to the invention are advantageously applied to checkings of pins in orbital motion by means of heads with Vee-shaped reference devices, as herein so far described. Alike method and apparatus are applicable for controlling the machining of the main journal 38 of the shaft 34 described with reference to FIG. 1.

Furthermore, similar controlling methods and apparatuses, for example employing heads with two feelers that provide signals indicative of diameter dimensions of pieces rotating about their axis, or with contactless checking heads (of optical or other known type) fall within the scope of the present invention and allow, in many applications, to control with identical standard of accuracy, reliability and speed the machining in machine tools as grinding machines.

As previously stated, the method and the apparatus according to the invention enable to have available, instant-by-instant, a value (as $R_I$) indicative of the actual dimension of the machined part at the area in contact with the tool. The use of such value ($R_I$) for controlling one or more machining phases is generally defined and managed by the control device of the machine (for example the numerical control 33).

The invention claimed is:

1. A method for controlling the machining of a piece in rotation in a machine tool by means of a checking apparatus, said method comprising:
   detecting instantaneous values indicative of radial dimensions of the piece,
   dynamically calculating average values of said instantaneous values during the machining,
   acquiring a variation index, indicative of the trend of the average values during the machining,
   dynamically calculating during the machining an instantaneous dimension on the basis of the calculated average value, the variation index and at least one correction coefficient, and
   controlling at least one machining phase on the basis of the calculated instantaneous dimension.

2. The method according to claim 1, wherein each of said average values is dynamically calculated on the basis of a sequence of the instantaneous values detected in a complete rotation of the piece during the machining.

3. The method according to claim 1, for controlling the machining in a grinding machine with a grinding-wheel in contact with the piece in rotation at a machining area, where said checking apparatus cooperates with the piece at at least one checking area, wherein said correction coefficient is evaluated on the basis of the arrangement of said machining area and of said at least one checking area.

4. The method according to claim 3, wherein said instantaneous dimension is an evaluation of the dimension of the piece at said machining area.

5. The method according to claim 3, wherein said checking apparatus includes a checking head with at least one feeler in contact with the piece at said at least one checking area, wherein said correction coefficient is evaluated on the basis of geometric characteristics of the arrangement of said grinding-wheel and of said at least one feeler with respect to the piece.

6. The method according to claim 5, wherein said checking head includes a Vee-shaped reference device, said at least one feeler being movable along a direction substantially coincident with the bisecting line of said Vee, or slightly angular with respect to said bisecting line, wherein the calculated instantaneous dimension is a radial dimension.

7. The method according to claim 1, wherein said variation index is calculated.

8. The method according to claim 7, wherein said variation index is calculated on the basis of the most recent dynamically calculated average values.

9. The method according to claim 8, wherein said average values on the basis of which said variation index is calculated are in a predetermined number.

10. The method according to claim 9, wherein said variation index is calculated by means of the following equation:

$$P = \frac{\sum_{j=s-(C-1)}^{s-1} (M(j+1) - M(j))}{C-1}$$

wherein s is a progressive number that identifies the most recently detected instantaneous value, C is said predetermined number of average values, and M(j+1) and M(j) are two of said dynamically calculated average values of the instantaneous values.

11. The method according to claim 1, for controlling the machining until the reaching of a nominal dimension of the piece, wherein the machining of the piece is controlled on the basis of a comparison between the calculated instantaneous dimension and said nominal dimension.

12. An apparatus for checking a piece in rotation during the machining in a numerical control machine tool, said apparatus comprising:
a checking head adapted to cooperate with the piece in rotation and emit electric signals indicative of the dimensions of the piece, and
a processing and display device connected to the checking head and to the numerical control of the machine tool, and adapted to receive said signals from the checking head, detect and process instantaneous values, and provide the numerical control with signals indicative of the dimensions of the piece,
wherein the processing and display device is adapted to perform, during the machining, the dynamic calculation of
average values of said instantaneous values, and
an instantaneous dimension of the piece on the basis of one of said calculated average values, of a variation index indicative of the variation of the average values during the machining, and of at least a correction coefficient,
the processing and display device being adapted to provide the numerical control with said instantaneous dimension of the piece.

13. The apparatus according to claim 12, for controlling the machining in a grinding machine with a grinding-wheel slide carrying a grinding-wheel in contact with the piece at a machining area, wherein said checking head cooperates with the piece at at least one checking area, the processing and display device being adapted to calculate said correction coefficient on the basis of the mutual arrangement of said machining area and said at least one checking area.

14. The apparatus according to claim 13, wherein the checking head includes a feeler and a Vee-shaped reference device adapted to contact the piece to be checked, said at least one feeler being movable with respect to the Vee-shaped reference device.

15. The apparatus according to claim 14, for the checking of a pin in orbital motion about an axis of rotation, wherein the Vee-shaped reference device is adapted to contact the pin and to maintain said contact substantially thanks to the force of gravity.

16. The apparatus according to claim 15, including a support structure for supporting in a movable way the checking head and enabling the feeler and the Vee-shaped reference device to maintain contact with the pin during its orbital motion.

17. The apparatus according to claim 16, wherein the support structure is coupled to the grinding-wheel slide of the grinding machine and includes reciprocally rotating coupling elements.

18. The apparatus according to claim 12, wherein the processing and display device is adapted to perform the dynamic calculation of said variation index on the basis of the most recent dynamically calculated average values.

* * * * *